US005585948A

United States Patent [19]
Petera

[11] Patent Number: 5,585,948
[45] Date of Patent: Dec. 17, 1996

[54] DOT MATRIX LIQUID CRYSTAL DISPLAY WITH LOW MULTIPLEX RATIO WITH EACH COLUMN ELECTRODE CONNECTED TO ONLY ONE OTHER

[75] Inventor: Michael G. Petera, Tempe, Ariz.

[73] Assignee: Three-Five Systems, Inc., Tempe, Ariz.

[21] Appl. No.: 394,658

[22] Filed: Feb. 22, 1995

[51] Int. Cl.⁶ .................................. G02F 1/1343
[52] U.S. Cl. ........................... 349/143; 349/152
[58] Field of Search ..................... 359/54, 87, 88

[56] References Cited

U.S. PATENT DOCUMENTS 4,653,860  3/1987  Hendrix ..................... 359/87

FOREIGN PATENT DOCUMENTS

| 0164152 | 12/1985 | European Pat. Off. | 359/87 |
| 2829602 | 2/1979 | Germany | 359/87 |
| 54-17049 | 2/1979 | Japan | 359/87 |
| 61-26022 | 2/1986 | Japan | 359/87 |
| 61-43722 | 3/1986 | Japan | 359/54 |

Primary Examiner—Anita Pellman Gross
Assistant Examiner—James A. Dudek
Attorney, Agent, or Firm—Tod R. Nissle, Esq.

[57] ABSTRACT

A dot matrix liquid crystal display has a low multiplex ratio and utilizes electrode leads which extend between adjacent electrodes on a glass plate substrate in the liquid crystal display.

18 Claims, 4 Drawing Sheets

DOT MATRIX LIQUID CRYSTAL DISPLAY WITH LOW MULTIPLEX RATIO WITH EACH COLUMN ELECTRODE CONNECTED TO ONLY ONE OTHER

This invention relates to a liquid crystal display.

More particularly, the invention relates to a dot matrix liquid crystal display having a low multiplex ratio.

Dot matrix liquid crystal displays (LCDs) are well known in the art. Such displays suffer from two disadvantages. First, the high multiplex ratio of dot matrix liquid crystal displays produces a display having a low contrast. Second, when there are many rows of "dots" in a dot matrix LCD, activating a row of "dots" can cause the unwanted illumination of other adjacent rows of dots.

Accordingly, it would be highly desirable to provide an improved liquid crystal display which would have a low multiplex ratio and provide high contrast.

Therefore, it is a principal object of the invention to provide an improved liquid crystal display.

A further object of the invention is to provide an improved dot matrix liquid display which has a low multiplex ratio and has high contrast.

These and other, further and more specific objects and advantages of the invention will be apparent to those skilled in the art from the following detailed description thereof, taken in conjunction with the drawings, in which.

Figure 1:
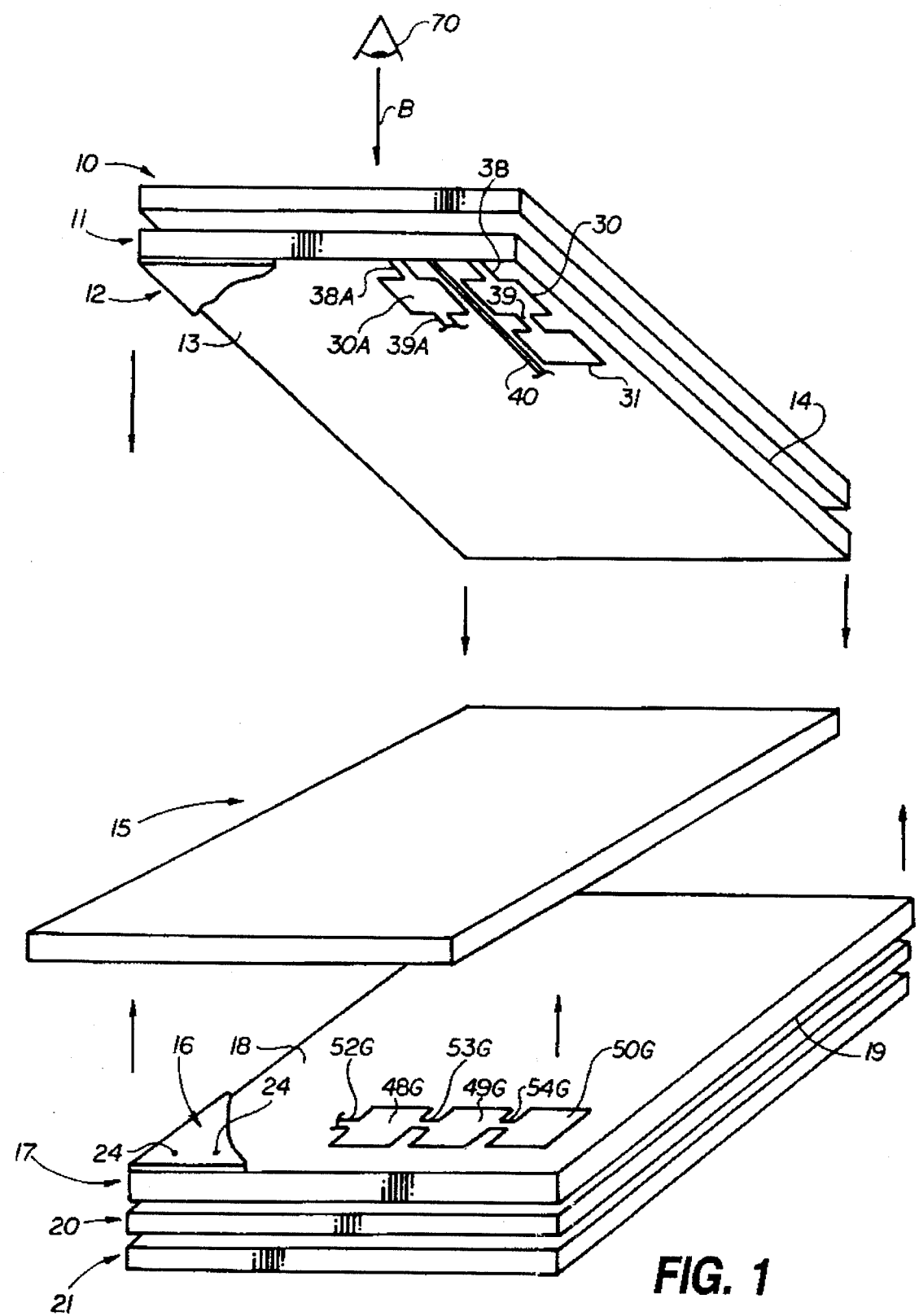
FIG. 1 is an exploded perspective view illustrating a LCD assembly constructed in accordance with the principles of the invention.

Briefly, in accordance with our invention, we provide an improved dot matrix liquid crystal display assembly. The assembly includes a first electrode plate having a face and a back; a plurality of spaced apart column electrodes on the face of the plate defining at least one column of electrodes, said column including a selected number of the electrodes; at least one bridge on the face of the plate and electrically interconnecting a pair of the electrodes in the column, the number of the electrodes interconnected by the bridge being less than the selected number of electrodes in the column; a first electrically conductive column lead on the face of the plate and connected to one of the electrodes interconnected by the bridge; a second electrically conductive column lead on the face of the plate and connected to an electrode in the column other than the pair of electrodes interconnected by the bridge; a second electrode plate having a face and a back, the face of the second plate being spaced apart from and opposed to the face of the first plate; a layer of liquid crystal material intermediate the face of the first plate and the face of the second plate; a plurality of spaced apart row electrodes on the face of the second plate, each of the row electrodes being spaced apart from, opposed to, and aligned with one of the electrodes in the column; a plurality of electrically conductive row leads on the face of the second plate and each connected to one of the row electrodes, a selected number of the row leads comprising a first group of row leads and a selected number of the row leads other than the row leads in the first group comprising a second group of row leads; means for applying repeatedly and sequentially voltage first simultaneously to each of the row leads in the first group of row leads and then simultaneously to each of the row leads in the second group of row leads such that voltage is prevented from being applied to the first and second groups of row leads at the same time; and, means for applying voltage to at least one of the first and second column leads simultaneously with the application of voltage to the first group of row leads. The multiplex ratio of the liquid crystal display assembly can be 1/2, 1/3, or 1/4.

In another embodiment of the invention, we provide an improved dot matrix liquid crystal display assembly. The liquid crystal display assembly includes a first electrode plate having a face and a back; a plurality of spaced apart electrodes on the face of the plate defining at least first and second columns of the electrodes, the columns each including a selected number of the electrodes, the first column being spaced apart from the second column; at least one bridge on the face of the plate and electrically interconnecting a pair of the electrodes in the first column, the number of the electrodes interconnected by the bridge being less than the selected number of electrodes in the first column; a first electrically conductive column lead on the face of the plate and connected to one of the electrodes connected by the bridge; a second electrically conductive column lead on the face of the plate intermediate and spaced apart from the first and second columns and connected to an electrode in the column other than the pair of electrodes interconnected by the bridge; a second electrode plate having a face and a back, the face of the second plate being spaced apart from and opposed to the face of the first plate; a layer of liquid crystal material intermediate the face of the first plate and the face of the second plate; a plurality of spaced apart row electrodes on the face of the second plate, each of the row electrodes being spaced apart from, opposed to, and aligned with one of the electrodes in the columns; a plurality of electrically conductive row leads on the face of the second plate and each connected to one of the row electrodes, a selected number of the row leads comprising a first group of row leads and a selected number of the row leads other than the row leads in the first group comprising a second group of row leads; means for applying voltage to the row leads; and, means for applying voltage to the column leads.

Turning now to the drawings, which describe the presently preferred embodiment of the invention for the purpose of illustrating the practice thereof and not by way of limitation of the scope of the invention, and in which like reference characters illustrate corresponding elements throughout the several views, FIG. 1 is an exploded assembly view of an LCD display or assembly constructed in accordance with the principles of the invention and generally including a polarizer 10, a glass plate 11 having transparent conductive electrodes, bridges, and leads which may have an alignment layer 12, a layer 15 of liquid crystal material (including either thermotropic liquid crystals and/or lyotropic liquid crystals as desired) including either thermotropic liquid, a glass plate 17 having transparent conductive electrodes and leads which may be coated with an alignment layer 16, spacers 24 (typically small glass or plastic spheres) for maintaining alignment layers 12, 16 and plates 11, 17 a selected distance apart, a polarizer 20, and a reflective layer, for example a mirror, 21. As would be appreciated by those of skill in the art, polarizer 20 can be transmissive or, if mirror 21 is eliminated, can be transflective and various other polarizer and/or mirror combinations can be utilized in the LCD assembly. Further, LCD assemblies which do not require polarizers and/or reflective or transreflective layers are well known in the art. Plates 11, 17 can be formed from glass, plastic, or any other desired electrically non-conductive material. By way of example, the electrodes, bridges, and leads can be formed from an indium-tin oxide composition; layers 12 and 16 can be formed from polyimide; and, layer 15 can be a twisted nematic liquid crystal. The LCD display of FIG. 1 is driven at a multiplex ratio of 1/2. As would be appreciated by those of skill in the art, the dot matrix LCD display of FIG. 1 ordinarily is used to form a single alphanumeric or other character, and, in normal commercial use a plurality of the LCD assemblies of FIG. 1 are utilized side-by-side so that a plurality of alphanumeric or other characters can be displayed simultaneously, as in, for example, a watch.

Figure 2:
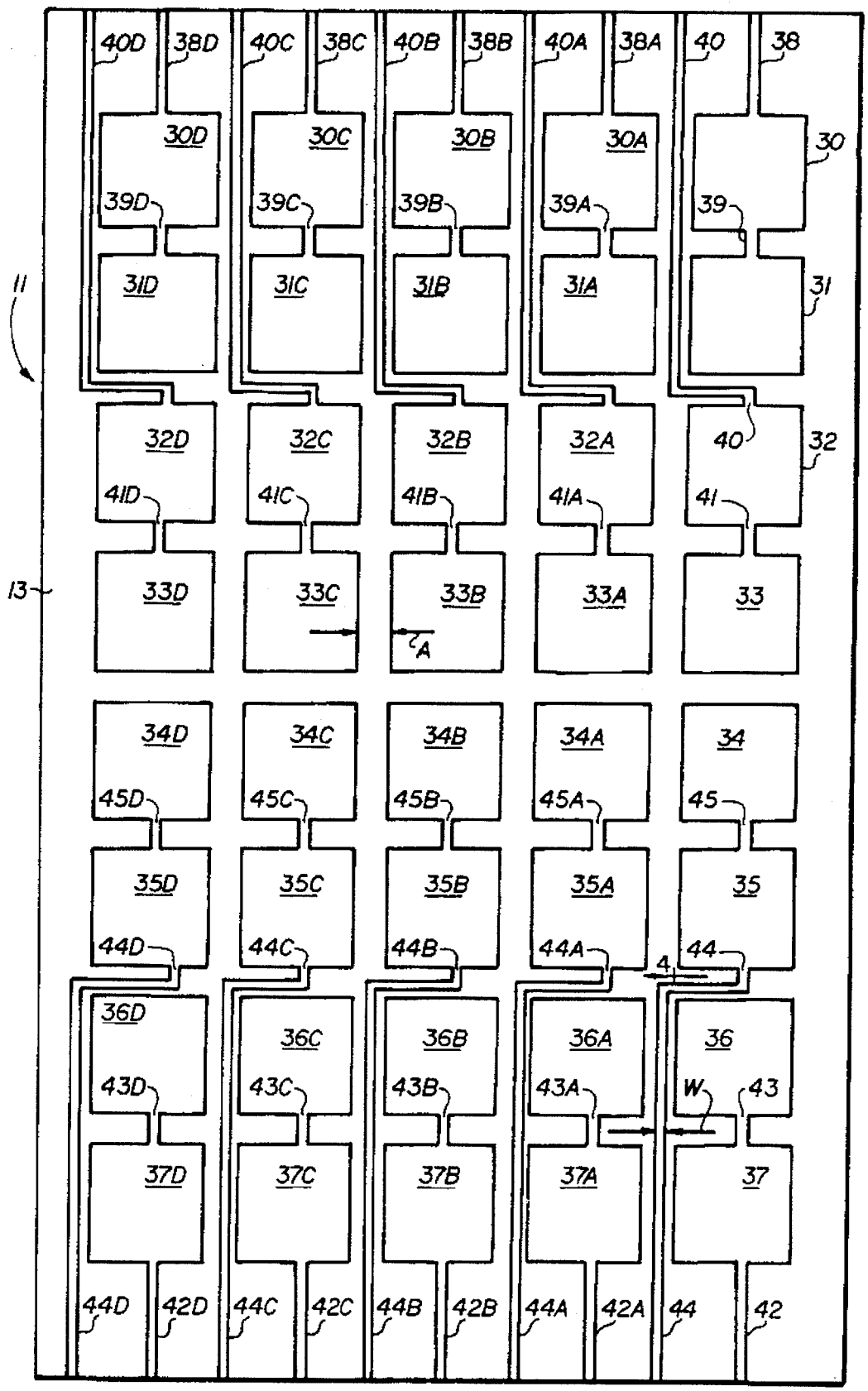
FIG. 2 is a top view of the face of one of the glass plates of the LCD assembly of FIG. 1 illustrating transparent conductive electrodes, bridges, and leads formed on the glass plate.

In FIG. 1, only a portion of the transparent conductive leads, bridges, and column electrodes formed on the face 13 of glass plate 11 are shown for the sake of clarity. FIG. 2 illustrates in detail each of the leads, bridges, and electrodes which are formed of thin, substantially transparent indium-tin oxide layers on the face 13. The leads, bridges, and electrodes can be formed from any desired electrically conductive material. The electrodes must be formed from substantially transparent material; the leads and bridges need not be formed from substantially transparent material. The first column of electrodes on face 13 includes electrodes 30 to 37; the second column of electrodes on face 13 includes electrodes 30A to 37A; the third column of electrodes includes electrodes 30B to 37B; the fourth column includes electrodes 30C to 37C; and, the fifth column includes electrodes 30D to 37D. Each electrode comprises a thin square-shaped ITO layer on surface 13.

Electrodes 30 and 31 are interconnected by bridge 39; electrodes 30A and 31A are interconnected by bridge 39A; electrodes 30B and 31B are interconnected by bridge 39B; electrodes 30C and 31C are interconnected by bridge 39C; and, electrodes 30D and 31D are interconnected by bridge 39D.

Electrodes 32 and 33 are interconnected by bridge 41; electrodes 32A and 33A are interconnected by bridge 41A; electrodes 32B and 33B are interconnected by bridge 41B; electrodes 32C and 33C are interconnected by bridge 41C; and, electrodes 32D and 33D are interconnected by bridge 41D.

Electrodes 34 and 35 are interconnected by bridge 45; electrodes 34A and 35A are interconnected by bridge 45A; electrodes 34B and 35B and interconnected by bridge 45B; electrodes 34C and 35C are interconnected by bridge 45C; and, electrodes 34D and 35D are interconnected by bridge 45D.

Electrodes 36 and 37 are interconnected by bridge 43; electrodes 36A and 37A are interconnected by bridge 43A; electrodes 36B and 37B are interconnected by bridge 43B; electrodes 36C and 37C are interconnected by bridge 43C; and, electrodes 36D and 37D are interconnected by bridge 44D.

Leads 38, 38A, 38B, 38C, 38D are connected to electrodes 30, 30A, 30B, 30C, 30D, respectively. Leads 40, 40A, 40B, 40C, 40D are connected to electrodes 32, 32A, 32B, 32C, 32D, respectively. Leads 42, 42A, 42B, 42C, 42D are connected to electrodes 37, 37A, 37B, 37C, 37D, respectively. Leads 44, 44A, 44B, 44C, 44D are connected to electrodes 35, 35A, 35B, 35C, 35D, respectively.

The distance, indicated by arrows A in FIG. 2, between each adjacent column of electrodes is presently typically about 3 mils, but can vary as desired.

Figure 3:
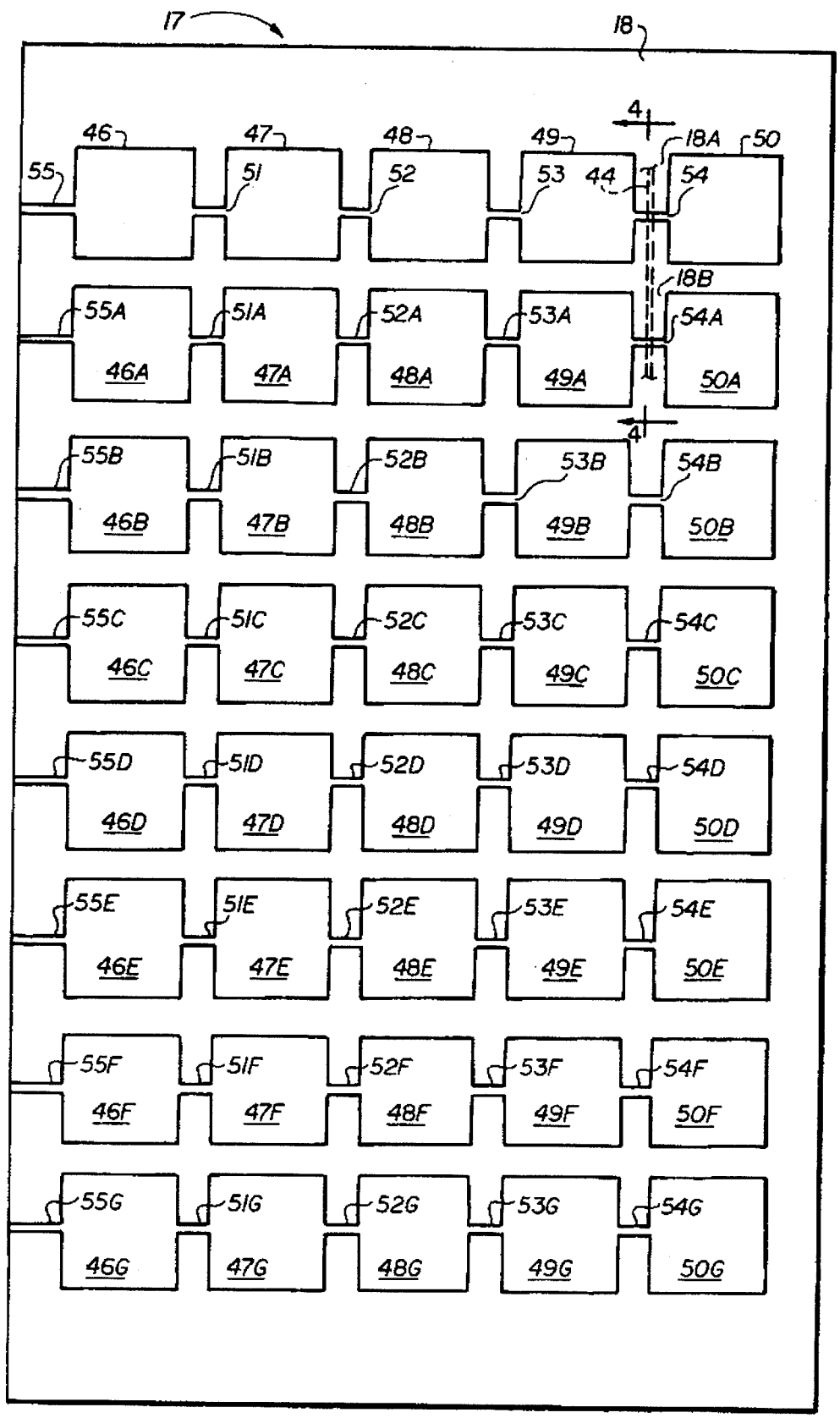
FIG. 3 is a top view of the face of the other of the glass plates of the LCD assembly of FIG. 1 illustrating transparent conductive electrodes, bridges, and leads formed on the glass plate; and, FIG. 4 is a section view of LCD assembly of FIG. 1 taken along section lines 4—4 in FIGS. 2 and 3 and illustrating further construction details thereof.

In FIG. 1, only a portion of the ITO leads, bridges, and row electrodes formed on the face 18 of glass plate 17 are shown for the sake of clarity. FIG. 3 illustrates each of the leads, bridges, and electrodes which are formed of thin, substantially transparent indium-tin oxide layers on the face 18. The leads, bridges, and electrodes can be formed from any desired electrically conductive material. The electrodes must be formed from substantially transparent material; the leads and bridges need not be formed from substantially transparent material. Each electrode comprises a square-shaped ITO layer on surface 13. The shape, contour, and dimension of each electrode, lead, and bridge on a face 13, 18 can vary as desired. The first row of electrodes includes electrodes 46 to 50; the second row includes electrodes 46A to 50A; the third row includes electrodes 46B to 50B; the third row includes electrodes 46C to 50C; the fourth row includes electrodes 46D to 50D; the fifth row includes electrodes 47E to 50E; the sixth row includes electrodes 47F to 50F; and, the eighth row includes electrodes 46F to 50G.

Bridge 51 interconnects electrodes 46 and 47; bridge 51A interconnects electrodes 46A and 47A; bridge 51B interconnects electrodes 46B and 47B; bridge 52C interconnects electrodes 46C and 47C; bridge 52D interconnects electrodes 46D and 47D; bridge 52E interconnects electrodes 46E and 47E; bridge 52F interconnects electrodes 46F and 47F; and, bridge 52G interconnects electrodes 46F and 47G.

Bridge 52 interconnects electrodes 47 and 48; bridge 52A interconnects electrodes 47A and 48A; bridge 52B interconnects electrodes 47B and 48B; bridge 52C interconnects electrodes 47C and 48C; bridge 52D interconnects electrodes 47D and 48D; bridge 52E interconnects electrodes 47E and 48E; bridge 52F interconnects electrodes 47F and 48F; and, bridge 52G interconnects electrodes 47G and 48G.

Bridge 53 interconnects electrodes 48 and 49; bridge 53A interconnects electrodes 48A and 49A; bridge 53B interconnects electrodes 48B and 49B; bridge 53C interconnects electrodes 48C and 49C; bridge 53D interconnects electrodes 48D and 49D; bridge 53E interconnects electrodes 48E and 49E; bridge 53F interconnects electrodes 48F and 49F; and, bridge 53G interconnects electrodes 48G and 49G.

Bridge 54 interconnects electrodes 49 and 50; bridge 54A interconnects electrodes 49A and 50A; bridge 54B interconnects electrodes 49B and 50B; bridge 54C interconnects electrodes 49C and 50C; bridge 54D interconnects electrodes 49D and 50D; bridge 54E interconnects electrodes 49E and 50E; bridge 59F interconnects electrodes 49F and 50F; and, bridge 54G interconnects electrodes 49G and 50G.

Electrode lead 55 connects to electrode 46; lead 55A connects to electrode 46A; lead 55B connects to electrode 46B; lead 55C connects to electrode 46C; lead 55D connects to electrode 46D; lead 55E connects to electrode 46E; lead 55F connects to electrode 46F; and, lead 55G connects to electrode 46G.

When the electrode unit of FIG. 1 is assembled, each square electrode on face 13 is directly opposed to, aligned with, and spaced apart from a square electrode on face 18 to form a stacked electrode pair. Forty (40) such electrode pairs are formed. A portion of the liquid crystal layer 15 is sandwiched between and intermediate each such stacked electrode pair. The forty opposing stacked electrode pairs include stacked electrode pairs 50-37, 49-37A, 48-37B, 47-37C, 46-37D, 50A-36, 49A-36A, 48A-36B, 47A-36C, 46A-36D, 50B-35, 49B-35A, 48B-35B, 47B-35C, 46B-35D, 50C-34, 49C-34A, 48C-34C, 47C-34D, 46C-34D, 50D-33, 49D-33A, 48D-33B, 47D-33C, 46D-33D, 50E-32, 49E-32A, 48E-32B, 47E-32C, 46E-32D, 50F-31, 49F-31A, 48F-31B, 47F-31C, 46F-31D, 50G-30, 49G-30A, 48G-30B, 47G-30C, and 46G-30D. As is well known in the art, the shape and dimension of each electrode can be varied as desired, as can the number of electrodes and electrode pairs (i.e., the stacked electrode pairs) and the number of columns and rows in the dot matrix display.

Each lead 40 to 40D and 44 to 44D presently preferably has a width of about one mil when it passes between a pair of adjacent electrodes. For example, the portion of lead 44 passing intermediate electrodes 37A and 37 has a width, indicated by arrows W in FIG. 2, of about one mil, leaving a space of about one mil between lead 44 and either electrode 37 or 37A.

As earlier noted, the electrodes, leads, and bridges on face 13 do not touch or contact the electrodes, leads, and bridges on face 18 because faces 13 and 18 are spaced apart by spacers 24. Further, when used, polyimide layers 12 and 16 cover the electrodes, bridges, and leads on each face 13 and 18. After, however, the mirror or other reflective surface 21, polarizers 10 and 20, plates 11 and 17 and liquid crystal layer 15 are sandwiched together in conventional fashion, each lead 44 to 44D and 40 to 40D (when viewed from above in the direction indicated by arrow B in FIG. 1) is seen to cross over certain of the bridges or leads at points intermediate adjacent pairs of electrodes. In particular, lead 44 crosses over bridges 54 and 54A; lead 44A crosses over bridges 53 and 53A; lead 44B crosses over bridges 52 and 52A; lead 44C crosses over bridges 51 and 51A; lead 44D crosses over leads 55 and 55A; lead 40D crosses over leads 55F and 55G; lead 40C crosses over bridges 51F and 51G; lead 40B crosses over bridges 52F and 52G; lead 40A crosses over bridges 53F and 53G; and lead 40 crosses over bridges 54F and 54G.

Figure 4:
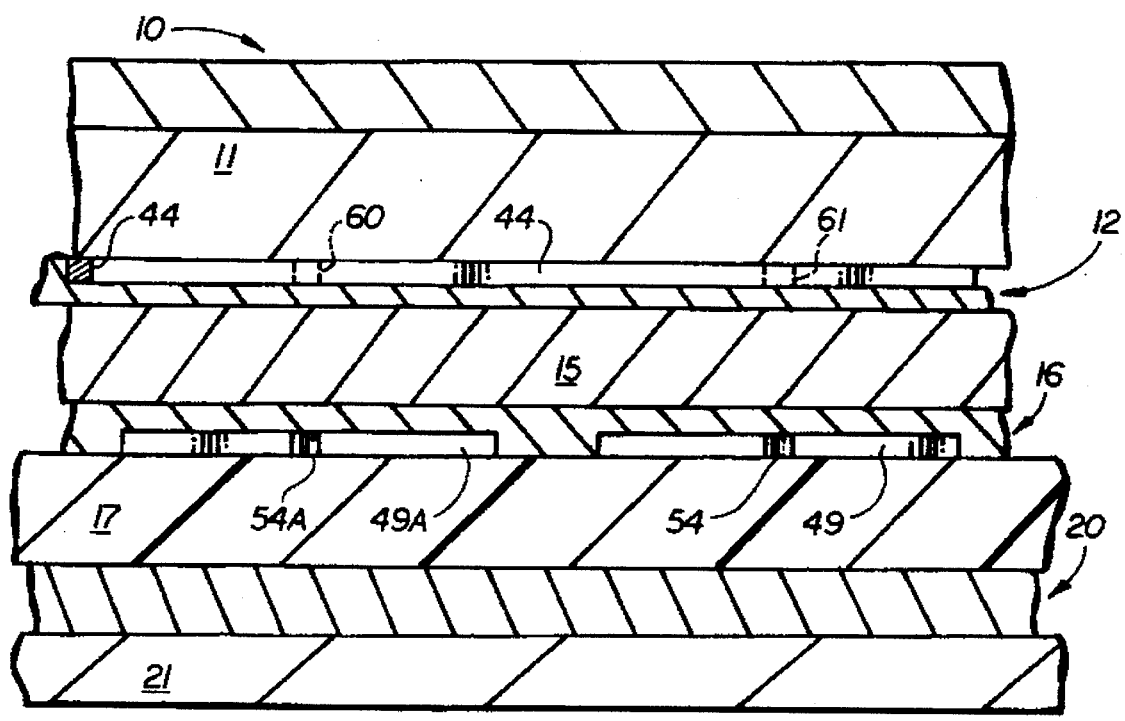

In FIG. 4, lead 44 is directly above and passes over the midpoints of bridges 54 and 54A in the manner indicated by dashed lines 44 in FIG. 3; i.e., lead 44 passes over and above the areas 18A and 18B of surface 18 which are intermediate each pair of adjacent electrodes 49-50 and 49A-50A. Since bridges 54 and 54A and lead 44 are presently each one mil wide, the "cross over" portions 60 and 61 of lead 44 which are directly above the mid-portion of bridges 54 and 54A in FIG. 1 are square. Each square "cross over" portion 60 and 61 has four edges each about 1 mil long. Consequently, the cross-sectional area of each portion 60 and 61 seen when viewed in the direction of arrow B in FIG. 1 is 1 square mil. Maintaining the cross-sectional area of each "cross over" portion 60, 61 of lead 44 at a size of 1 square mil or less reduces the likelihood that portions 60 and 61 will, if activated, produce sufficient "cross over illumination" or light (or produce a dark spot of sufficient size) to distract from or interfere with light emanating through (or the dark spot produced by) an adjacent electrode 49, 50, 49A or 50A and its polarizer 10. The cross-sectional area of each "cross over" portion 60, 61 of lead 44 can be as large or as small as desired, however, it is preferred that the size of such cross-sectional areas be sufficiently small to not be readily visible by the eye from normal viewing distances of approximately twelve to eighteen inches. The shape and dimension of each "cross over" portion can vary as desired. If desired, black or other opaque matrix color material may be deposited over bridges 54, 54A, etc. to mask cross over illumination; for example, black material may be deposited in the polyimide layer as a part of the polyimide layer over bridges 54, 54A. In practice, it is presently preferred that each lead 44 be spaced at least 1 mil apart from any electrode 36, 36A, 37, 37A adjacent the lead. The purpose of the spacing between the electrodes 36, 36A, etc. and adjacent leads 44, etc. is to prevent shorts between the electrodes and leads.

The relative proportions of the various components of the LCD assembly as shown in FIG. 4 are not accurate. The proportions shown in FIG. 4 were selected to facilitate the explanation of how the LCD assembly of the invention functions.

The operation of the 1/2 mux (1/2 multiplex ratio) LCD display of FIGS. 1 to 4 is illustrated by describing how the display is operated to form the numeral one. While the voltage differential between the electrodes on face 18 and the electrodes on face 13 can vary as desired, it is assumed in this example that the AC or DC voltage differential is about five volts in order to activate the liquid crystal material between each stacked electrode pair. As is well known, it is presently preferred that an AC voltage differential be utilized. The polarity of the voltage in the electrodes on face 13 differs from the polarity of the voltage in the electrodes on face 18. If the polarity of all of the electrodes on face 13 is positive, then the polarity of all of the electrodes on face 18 is negative. During each cycle, the polarity of the activated electrodes on a face 13, 18 is changed. During each cycle, the electrodes on a face 13, 18 are activated by applying a voltage to obtain the required five volt differential between selected ones of the forty opposing stacked electrode pairs 50-37, 49-37A, 48-37B, 47-37C, 46-37D, 50A-36, 49A-36A, 48A-36B, 47A-36C, etc. The voltage differential required to drive 1/2, 1/3, 1/4 or greater multiplex ratios is well known to those skilled in the art.

To produce the numeral one on the LCD display of FIG. 1, during the first time cycle leads 55A, 55C, 55D, and 55G are activated simultaneously with leads 38, 38A, 38B, 38C, 38D, 40B, 44B, 42B, and 42C. This activates the opposing electrode pairs 30-50G, 30A-49G, 30B-48G, 30C-47G, 30D-46G, 32A-48E, 34B-48C, 36B-48A, and 36C-47A. When the electrode pairs are activated, the twisted nematic liquid crystals in layer 15 align toward the charges on the electrodes which, depending on the types of polarizers 10 and 20 utilized, causes light to travel outwardly through the electrode on face 13 and through polarizer 10 toward the eye 70 of the view or causes the electrode area on face 13 to appear black when viewed by eye 70 "through" polarizer 10. During the second time cycle, all of the leads activated during the first time cycle are deactivated, and leads 55, 55B, 55D, 55F are activated simultaneously with leads 42B, 44B, 40B and 38B. This activates the opposing electrode pairs 31B-48F, 33B-48D, 35B-48B, 37B-48. After the second time cycle is completed, then all of the leads activated during the second time cycle are deactivated, the first time cycle is repeated, then the second, then the first, etc. Each time cycle lasts only a short period of time, typically twenty milliseconds or less. Voltage applied to selected stacked electrode pairs during the time interval of the first cycle can continue to be applied for a small fraction of time at the beginning of the time interval during which voltage is applied to selected stacked electrode pairs during the second cycle. This small overlap of the simultaneous application of voltage during the first and second cycles does not, however, alter the basic function of an LCD of the invention in applying voltage only to selected stacked electrode pairs during the first cycle and in then applying voltage only to selected other stacked electrode pairs during the second cycle.

As would be appreciated by those of skill in the art, appropriate lead-bridge-electrode configurations can be produced which will produce an LCD display having a 1/3 or 1/4 multiplex ratio instead of the 1/2 multiplex ratio of the LCD display of FIGS. 1 to 4. In comparison to a conventional dot matrix LCD display, the LCD display of FIG. 1 significantly increases the RMS voltage differential to each pair of opposing stacked electrodes. The use of leads 40, 40A, etc. which extend between adjacent column electrodes, the use of bridges 39, 39A, etc. to interconnect only a portion of the electrodes in a column, and the simultaneous activation of two or more rows of electrodes enables all of the electrode pairs required to produce an alphanumeric character or other character in an LCD display to be activated in only 2, 3 or 4 time cycles. The invention can also be utilized in configurations which activate all of the electrode pairs in five or more time cycles, but the reduction of the multiplex ratio in comparison to the prior art is normally not sufficient to warrant such configurations.

In FIGS. 1 to 4, each lead, bridge, and electrode extends only over and is on a face 13, 18. As would be appreciated by those of skill in the art, all or a portion of a lead, bridge, or electrode could, if desired, extend to, into, through, or over another portion of a plate 11 or 17 or could extend to, into, through, or over any other layer of material comprising an LCD assembly constructed in accordance with the invention.

The pitch or spacing between adjacent rows or columns can vary as desired as can the width of each row or column.

Having described our invention in such terms as to enable those skilled in the art to understand and practice it, and having identified the presently preferred embodiments thereof, we claim:

1. A dot matrix liquid crystal display assembly including:
   (a) a first electrode plate having a face and a back;
   (b) a plurality of spaced apart electrodes on the face of said plate defining a first column of electrodes, each of said electrodes being connected and bridged only to one other electrode, said one other electrode being in said first column;
   (c) a plurality of spaced apart electrodes on the face of said plate defining a second column of electrodes, said second column being spaced apart from said first column, each of said electrodes in said second column being connected and bridged only to a single other electrode in said second column, said single other electrode being in said second column, said first and second columns each being comprised of interconnected electrode pairs,
   (d) at least one bridge on the face of said plate and electrically interconnecting a pair of said electrodes in said first column, the number of said electrodes interconnected by said bridge being less than said selected number of said electrodes in said first column;
   (e) a first electrically conductive column lead on the face of said plate and connected to one of said electrodes connected by said bridge;
   (f) a second electrically conductive column lead on the face of said plate intermediate and spaced apart from said first and second columns and connected to an electrode in said first column other than said pair of electrodes interconnected by said bridge;
   (g) a second electrode plate having a face and a back, said face of said second plate being spaced apart from and opposed to said face of said first plate;
   (h) a layer of liquid crystal material intermediate said face of said first plate and said face of said second plate;
   (i) a plurality of spaced apart rows of electrodes on the face of said second plate, each of said row electrodes being spaced apart from, opposed to, and aligned with one of said electrodes in said columns;
   (j) a plurality of electrically conductive row leads on the face of said second plate and each connected to one of said rows of electrodes, a selected number of the row leads comprising a first group of row leads and a selected number of the row leads other than the row leads in said first group comprising a second group of row leads;
   (k) means for alternately applying voltage to said first and second groups of said row leads; and,
   (l) means for applying voltage to any desired quantity of said column leads at the same time voltage is applied to one of said first and second groups of said row leads.

2. The liquid crystal display of claim 1 wherein said display has a multiplex ratio of 1/2.

3. The liquid crystal display of claim 1 wherein said display has a multiplex ratio of 1/3.

4. The liquid crystal display of claim 1 wherein said display has a multiplex ratio of 1/4.

5. A dot matrix liquid crystal display assembly including:
   (a) a first electrode plate having a face and a back;
   (b) a plurality of spaced apart electrodes on the face of said plate defining a first column of electrodes, each of said electrodes being connected and bridged only to one other electrode, said one other electrode being in said first column;
   (c) a plurality of spaced apart electrodes on the face of said plate defining a second column of electrodes, said second column being spaced apart from said first column, each of said electrodes in said second column being connected and bridged only to a single other electrode in said second column, said single other electrode being in said second column, said first and second columns each being comprised of interconnected electrode pairs,
   (d) at least one bridge on the face of said plate and electrically interconnecting a pair of said electrodes in said first column, the number of said electrodes interconnected by said bridge being less than said selected number of said electrodes in said first column;
   (e) a first electrically conductive column lead on the face of said plate and connected to one of said electrode pairs;
   (f) a second electrically conductive column lead on the face of said plate intermediate and spaced apart from said first and second columns and connected to another of said electrode pairs;
   (g) a second electrode plate having a face and a back, said face of said second plate being spaced apart from and opposed to said face of said first plate;
   (h) a layer of liquid crystal material intermediate said face of said first plate and said face of said second plate;
   (i) a plurality of spaced apart rows of electrodes on the face of said second plate, each of said row electrodes being spaced apart from, opposed to, and aligned with one of said electrodes in said columns, each of said electrodes in one of said rows being connected and bridged only to an adjacent electrode or electrodes in said one of said rows;
   (j) a plurality of row bridges, said row bridges each interconnecting only a pair of adjacent electrodes in one of said rows;
   (k) a plurality of electrically conductive row leads on the face of said second plate and each connected to one of said rows of electrodes, a selected number of said row leads comprising a first group of row leads and a selected number of said row leads other than said row leads in said first group comprising a second group of row leads;

(l) means for alternately applying voltage to said first and second groups of said row leads; and, (m) means for applying voltage to any desired quantity of said column leads at the same time voltage is applied to one of said first and second groups of said row leads.

6. The liquid crystal display of claim 5 wherein said display has a multiplex ratio of 1/2.

7. The liquid crystal display of claim 5 wherein said display has a multiplex ratio of 1/3.

8. The liquid crystal display of claim 5 wherein said display has a multiplex ratio of 1/4.

9. A dot matrix liquid crystal display assembly including:

(a) a first electrode plate having a face and a back;

(b) a plurality of spaced apart electrodes on the face of said plate defining a first column of electrodes, each of said electrodes being connected and bridged only to one other electrode, said one other electrode being in said first column;

(c) a plurality of spaced apart electrodes on the face of said plate defining a second column of electrodes, said second column being spaced apart from said first column, each of said electrodes in said second column being connected and bridged only to a single other electrode in said second column, said single other electrode being in said second column, said first and second columns each being comprised of interconnected electrode pairs, (d) at least one bridge on the face of said plate and electrically interconnecting a pair of said electrodes in said first column, the number of said electrodes interconnected by said bridge being less than said selected number of said electrodes in said first column;

(e) a first electrically conductive column lead on the face of said plate and connected to one of said electrode pairs;

(f) a second electrically conductive column lead
 (i) extending over a portion of the face of said plate intermediate said first and second columns,
 (ii) spaced apart from said first and second columns, and
 (iii) connected to another of said electrode pairs;

(g) a second electrode plate having a face and a back, said face of said second plate being spaced apart from and opposed to said face of said first plate;

(h) a layer of liquid crystal material intermediate said face of said first plate and said face of said second plate;

(i) a plurality of spaced apart rows of electrodes on the face of said second plate, each of said row electrodes being spaced apart from, opposed to, and aligned with one of said electrodes in said columns, each of said electrodes in one of said rows being connected and bridged only to an adjacent electrode or electrodes in said one of said rows;

(j) a plurality of row bridges, said row bridges each interconnecting only a pair of adjacent electrodes in one of said rows, one of said row bridges crossing over said second column lead, the portion of said row bridge crossing over said second column lead being one square mil or less to minimize cross over illumination;

(k) a plurality of electrically conductive row leads on the face of said second plate and each connected to one of said rows of electrodes, a selected number of said row leads comprising a first group of row leads and a selected number of said row leads other than said row leads in said first group comprising a second group of row leads;

(l) means for alternately applying voltage to said first and second groups of said row leads; and, (m) means for applying voltage to any desired quantity of said column leads at the same time voltage is applied to one of said first and second groups of said row leads.

10. The liquid crystal display of claim 9 wherein said display has a multiplex ratio of 1/2.

11. The liquid crystal display of claim 10 wherein said bridges interconnecting said electrodes in said columns each are (a) spaced away from said portion of said first plate intermediate said first and second columns; and, (b) intermediate a pair of said electrodes on said first plate.

12. The liquid crystal display of claim 11 wherein said second column lead is the only one of said column leads which is between said electrodes in said first and second columns which are positioned laterally from and adjacent to said second column lead.

13. The liquid crystal display of claim 9 wherein said display has a multiplex ratio of 1/3.

14. The liquid crystal display of claim 13 wherein said bridges interconnecting said electrodes in said columns each are (a) spaced away from said portion of said first plate intermediate said first and second columns; and, (b) intermediate a pair of said electrodes on said first plate.

15. The liquid crystal display of claim 14 wherein said second column lead is the only one of said column leads which is between said electrodes in said first and second columns which are positioned laterally from and adjacent to said second column lead.

16. The liquid crystal display of claim 9 wherein said display has a multiplex ratio of 1/4.

17. The liquid crystal display of claim 16 wherein said bridges interconnecting said electrodes in said columns each are (a) spaced away from said portion of said first plate intermediate said first and second columns; and, (b) intermediate a pair of said electrodes on said first plate.

18. The liquid crystal display of claim 17 wherein said second column lead is the only one of said column leads which is between said electrodes in said first and second columns which are positioned laterally from and adjacent to said second column lead.

* * * * *